(12) United States Patent
Aoki

(10) Patent No.: US 11,262,243 B2
(45) Date of Patent: Mar. 1, 2022

(54) VEHICLE LAMP, INSPECTION METHOD OF VEHICLE LAMP, AND INSPECTION APPARATUS FOR VEHICLE LAMP

(71) Applicant: Koito Manufacturing Co., Ltd., Tokyo (JP)

(72) Inventor: Yusuke Aoki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 344 days.

(21) Appl. No.: 16/279,044

(22) Filed: Feb. 19, 2019

(65) Prior Publication Data
US 2019/0271596 A1 Sep. 5, 2019

(30) Foreign Application Priority Data
Mar. 2, 2018 (JP) .............................. JP2018-037834

(51) Int. Cl.
*G01J 5/00* (2006.01)
*F21S 41/148* (2018.01)
*F21S 45/47* (2018.01)

(52) U.S. Cl.
CPC ........... *G01J 5/0003* (2013.01); *F21S 41/148* (2018.01); *F21S 45/47* (2018.01)

(58) Field of Classification Search
CPC .. F21S 45/47; F21S 43/14; F21S 45/49; F21S 45/48; F21V 23/0442; F21V 29/507; F21V 29/70; F21V 29/83; F21V 23/0457; G01J 5/0007; G01J 5/025; G01J 5/0896; G01J 5/02; G01J 5/0003; G01N 25/72; G01K 11/125; G01K 7/01

See application file for complete search history.

(56) References Cited

U.S. PATENT DOCUMENTS 8,172,434 B1 * 5/2012 Olsson .................... B63B 45/00
362/346
2011/0025211 A1 * 2/2011 Bae ....................... F21V 29/763
315/113

FOREIGN PATENT DOCUMENTS

| CN | 102109161 A | 6/2011 |
| CN | 106247244 A | 12/2016 |
| JP | 2015-207391 A | 11/2015 |
| JP | 2018194466 A * | 12/2018 |

OTHER PUBLICATIONS

An Office Action dated Dec. 3, 2020, issued from the China National Intellectual Property Administration (CNIPA) of Chinese Patent Application No. 201910142695.X and a EN translation thereof (11 pages).

* cited by examiner

*Primary Examiner* — Omar Rojas Cadima
(74) *Attorney, Agent, or Firm* — Abelman, Frayne & Schwab

(57) ABSTRACT

A vehicle lamp includes a light emitting source, a support substrate configured to support the light emitting source, a heat sink configured to support the support substrate and dissipate heat from the light emitting source, and a light controller configured to control light from the light emitting source. The heat sink includes an opening configured to measure the radiant heat of the support substrate.

6 Claims, 4 Drawing Sheets

VEHICLE LAMP, INSPECTION METHOD OF VEHICLE LAMP, AND INSPECTION APPARATUS FOR VEHICLE LAMP

CROSS-REFERENCE TO RELATED APPLICATIONS

This application is based on and claims priority from Japanese Patent Application No. 2018-037834, filed on Mar. 2, 2018, with the Japan Patent Off ice, the disclosure of which is incorporated herein in its entirety by reference.

TECHNICAL FIELD

The present disclosure relates to a vehicle lamp, an inspection method thereof, and an inspection apparatus for the vehicle lamp.

BACKGROUND

Japanese Patent Laid-Open Publication No. 2015-207391 discloses a vehicle lamp including a substrate in which an LED is mounted on a lower surface of a metallic plate-like support member, a parabolic reflector that reflects light from the LED to the front of the lamp, and a heat dissipation fin provided to be erected on an upper surface of the support member, and configured to dissipate heat from the LED.

SUMMARY

In an assembling of a vehicle lamp using a light emitting element such as an LED, there is a case where a step is present in which temperature of a surrounding portion of the light emitting element is measured at the time of light emission, and the vehicle lamp is identified as a defective product when the temperature thereof is higher than a predetermined reference value. However, it may be difficult to measure the temperature of the peripheral portion of the light emitting element, due to the presence of a reflector that reflects light from the light emitting element or a heat sink that dissipates heat from the light emitting element.

The present disclosure has been made in consideration of the circumstances, and the present disclosure is to provide a vehicle lamp, an inspection method thereof, and an inspection apparatus for the vehicle lamp able to easily perform a temperature inspection.

In order to solve the problem, a vehicle lamp according to an aspect of the present disclosure includes a light emitting source; a support substrate configured to support the light emitting element; a heat sink configured to support the support substrate and dissipate heat from the light emitting source; and a light controller configured to control light from the light emitting source. The heat sink includes an opening configured to measure radiant heat of the support substrate.

The heat sink has a configuration in which a plate is bent so as to have a first portion and a second portion that is bent at a predetermined angle with respect to the first portion, the light emitting source may be arranged on the first portion, and the opening may be provided on the second portion.

The opening may be provided such that a part of the support substrate is exposed behind the vehicle lamp.

Another aspect of the present disclosure is a method for inspecting a vehicle lamp. The vehicle lamp includes: a light emitting source; a support substrate configured to support the light emitting source; a heat sink configured to support the support substrate and dissipate heat from the light emitting source; and a light controller configured to control light from the light emitting source. The method includes measuring radiant heat of the support substrate through an opening provided at the heat sink.

Yet another aspect of the present disclosure is an apparatus for inspecting a vehicle lamp. The vehicle lamp includes: a light emitting source; a support substrate configured to support the light emitting element; a heat sink configured to support the support substrate and dissipate heat from the light emitting source; and a light controller configured to control light from the light emitting source. The apparatus includes a radiant temperature sensor that measures a radiant heat of the support substrate through an opening provided at the heat sink.

According to the present disclosure, it is possible to provide a vehicle lamp, an inspection method thereof, and an inspection apparatus for the vehicle lamp able to easily perform a temperature inspection.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a vehicle lamp according to an embodiment of the present disclosure will be described in detail with reference to the drawings. In the present specification, the terms representing directions such as, for example, "upper," "lower," "front," "rear," "left," "right," "inner," and "outer" as used here mean directions in a posture when the vehicle lamp is mounted on the vehicle.

Figure 1:
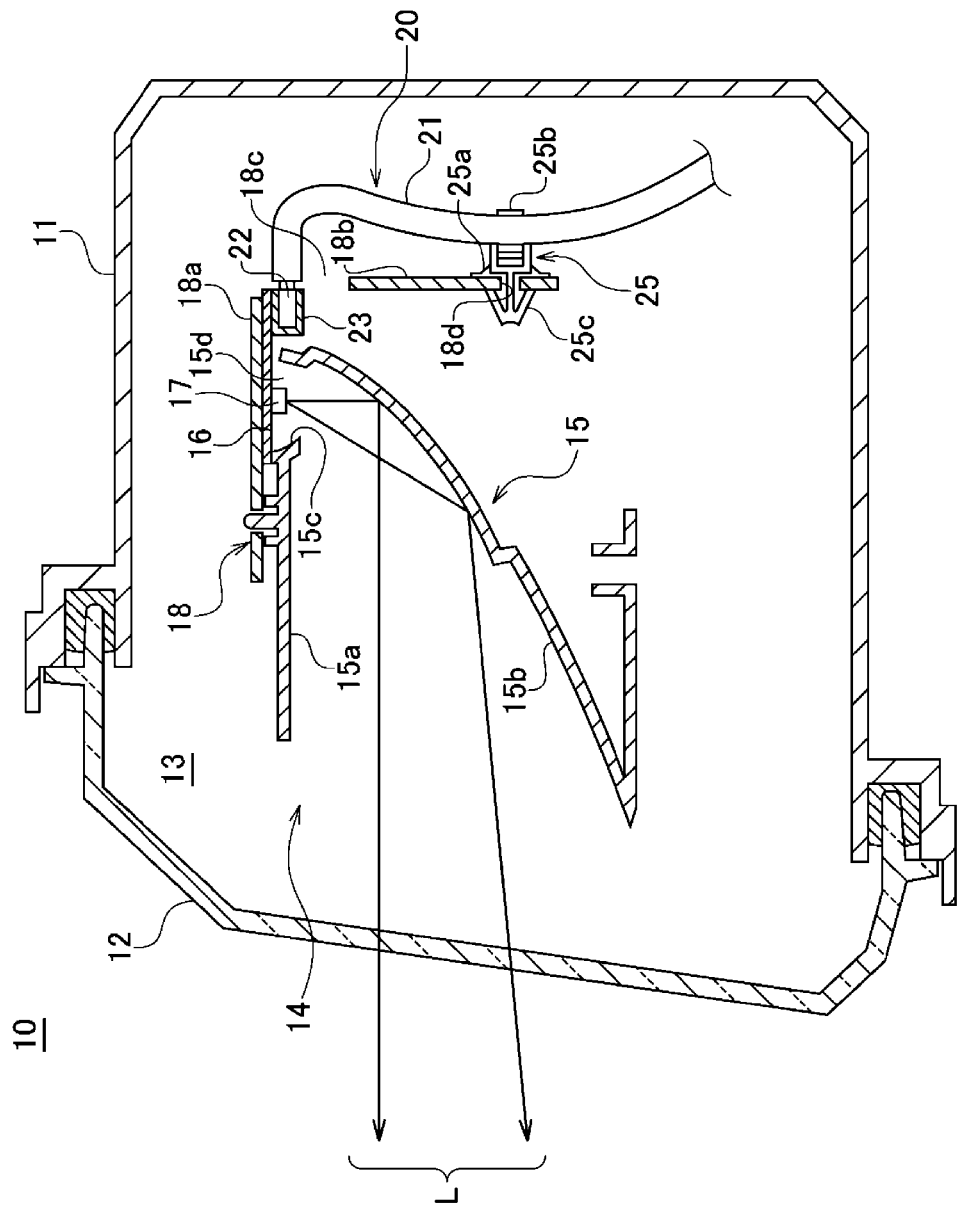
FIG. 1 is a schematic cross-sectional view of a vehicle lamp according to an embodiment of the present disclosure.

FIG. 1 is a schematic cross-sectional view of a vehicle lamp 10 according to an embodiment of the present disclosure. The vehicle lamp 10 may be a headlight arranged at the front portion of a vehicle.

As illustrated in FIG. 1, the vehicle lamp 10 includes a lamp body 11 and a transparent outer cover 12 that covers a front surface opening of the lamp body 11. The lamp body 11 and the outer cover 12 form a lamp chamber 13.

A lamp unit 14 is accommodated in the lamp chamber 13. The lamp unit 14 may be configured to irradiate a high beam light distribution pattern or a low beam light distribution pattern. The lamp unit 14 may be tiltably supported with respect to the lamp body 11 by a support member (not illustrated) for the purpose of aiming adjustment.

The lamp unit 14 includes a reflector unit 15, a support substrate 16, an LED 17 as a light source, and a heat sink 18.

The reflector unit 15 includes an upper horizontal extending portion 15a that extends in a horizontal direction, a reflector portion 15b as a light control member that controls light from the LED 17, and a shade portion 15c.

A hole portion 15d configured to guide the light from the LED 17 to the reflector portion 15b is formed in the upper horizontal extending portion 15a. The reflector portion 15b extends forward and obliquely downward from a rear portion of the hole portion 15d in the upper horizontal extending portion 15a. The reflector portion 15b is a parabolic reflector that reflects the light from the LED 17 to the front of the lamp. The reflector portion 15b has a reflecting surface formed with reference to a parabolic surface of rotation. A rotation center axis of the parabolic surface of the rotation of the reflecting surface is an optical axis of the reflector portion 15b. The reflector portion 15b is arranged such that the optical axis thereof faces the front-and-rear direction (horizontal direction) of the vehicle. The LED 17 is arranged at a focal position of the reflecting surface of the reflector portion 15b.

The shade portion 15c is formed at a front portion of the hole portion 15d in the upper horizontal extending portion 15a. The shade portion 15c prevents the light from the LED 17 from being emitted directly to the outside of the lamp.

The support substrate 16 is supported on the upper horizontal extending portion 15a of the reflector unit 15. The LED 17 is mounted on the lower surface of the support substrate 16 such that the light emitting surface faces downward. As described above, the LED 17 is arranged at the focal position of the reflecting surface of the reflector portion 15b. The LED 17 emits light by being supplied with a current from the support substrate 16. FIG. 1 illustrates an example of light rays that are emitted from the LED 17, and then reflected at the reflecting surface of the reflector portion 15b to be emitted forward of the lamp.

The current for causing the LED 17 to emit light is supplied to the support substrate 16 by a power supply 20. The power supply 20 includes a cable 21 connected to a current source (not illustrated) outside the lamp chamber, a movable side connector 22 provided at a distal end portion of the cable 21, and a standby side connector 23 provided at a rear end portion of the lower surface of the support substrate 16. The standby side connector 23 is positioned behind the reflector portion 15b. The movable side connector 22 may be inserted into or removed from the standby side connector 23.

The heat sink 18 has a configuration in which a metallic plate such as an aluminum plate is bent in an L-shape, and has a first portion 18a extending in the horizontal direction and a second portion 18b bent at a predetermined angle (in the present embodiment, 90°) with respect to the first portion 18a. The heat sink 18 is arranged such that the first portion 18a is located on the upper surface of the support substrate 16, and also the second portion 18b extends downward from the first portion 18a behind the reflector portion 15b. An insulating sheet may be interposed between the first portion 18a of the heat sink 18 and the upper surface of the support substrate 16.

As illustrated in FIG. 1, the support substrate 16 is supported on the lower surface of the first portion 18a of the heat sink 18, and the LED 17 is supported on the lower surface of the support substrate 16. Therefore, heat generated from the LED 17 is transferred to the first portion 18a and the second portion 18b of the heat sink via the support substrate 16, and then dissipated into the air in the lamp chamber 13.

A cable clamp 25 that routes the cable 21 on the second portion 18b is provided at the second portion 18b of the heat sink 18. The cable clamp 25 is made of, for example, an elastic member such as resin or rubber, and includes a disc-shaped base portion 25a, a holding portion 25b provided on the base portion 25a to hold the cable 21, and an insertion piece portion 25c provided on the opposite side to the holding portion 25b of the base portion 25a to fix the cable clamp 25 to the second portion 18b.

A clamp fixing hole 18d through which the insertion piece portion 25c of the cable clamp 25 is inserted is formed at the second portion 18b of the heat sink 18. The insertion piece portion 25c is reduced in diameter thereof when it is inserted into the clamp fixing hole 18d, and extends in diameter and is locked after it is inserted into the clamp fixing hole 18d. Therefore, the cable clamp 25 is fixed to the second portion 18b of the heat sink 18. The fixing method of the cable clamp 25 to the second portion 18b is not particularly limited. The cable clamp 25 may be fixed by using a screw or a double-sided tape.

It is possible to prevent occurrence of problems such as disconnection in the cable 21 caused by interference with the edge of the metallic second portion 18b when the cable 21 is bent, by providing the cable clamp 25 at the second portion 18b of the heat sink 18 and clamping the cable 21. The cable clamp 25 may be arranged at a peripheral portion of the second portion 18b. In this case, it is possible to prevent the interference between the cable 21 and the edge of the second portion 18b more appropriate.

Figure 2:
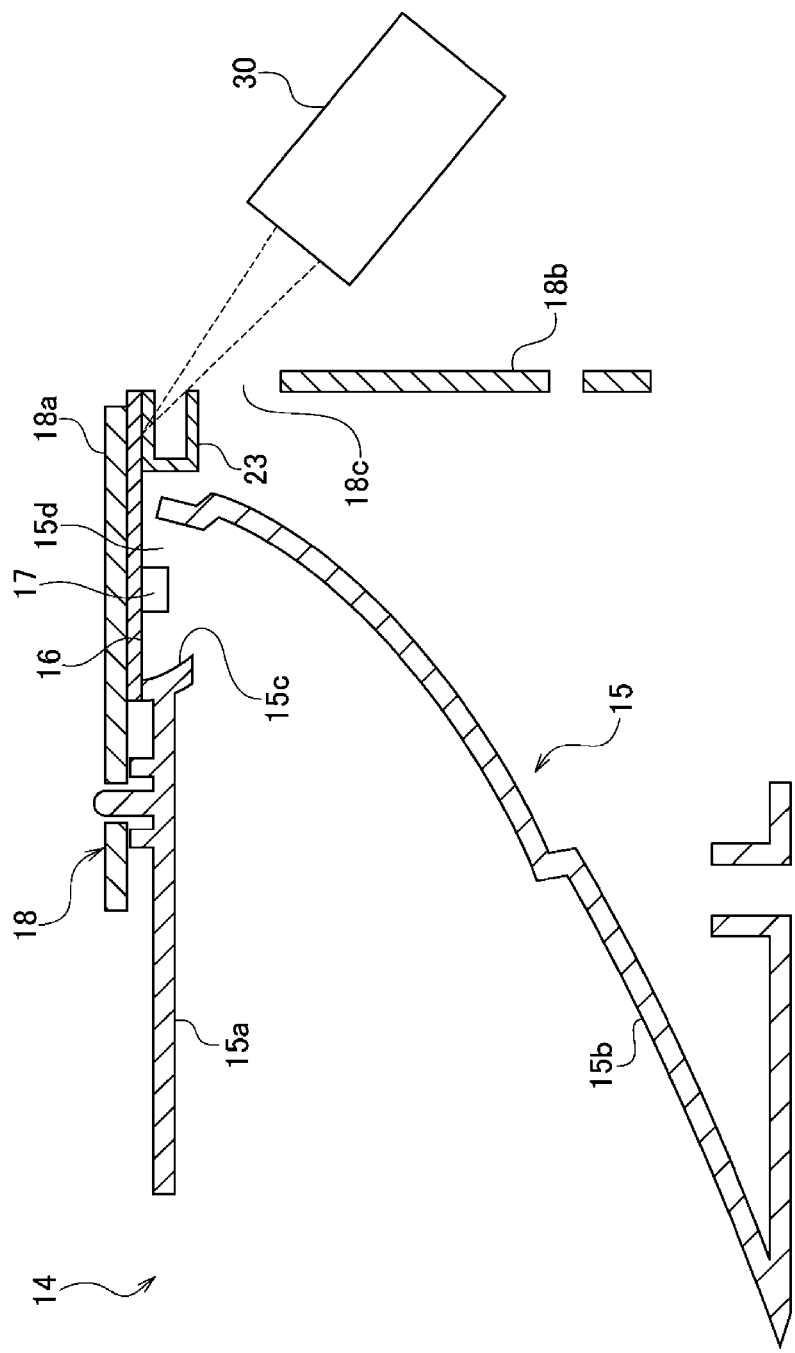
FIG. 2 is a schematic cross-sectional view explaining how a temperature inspection of a lamp unit is performed.
Figure 3:
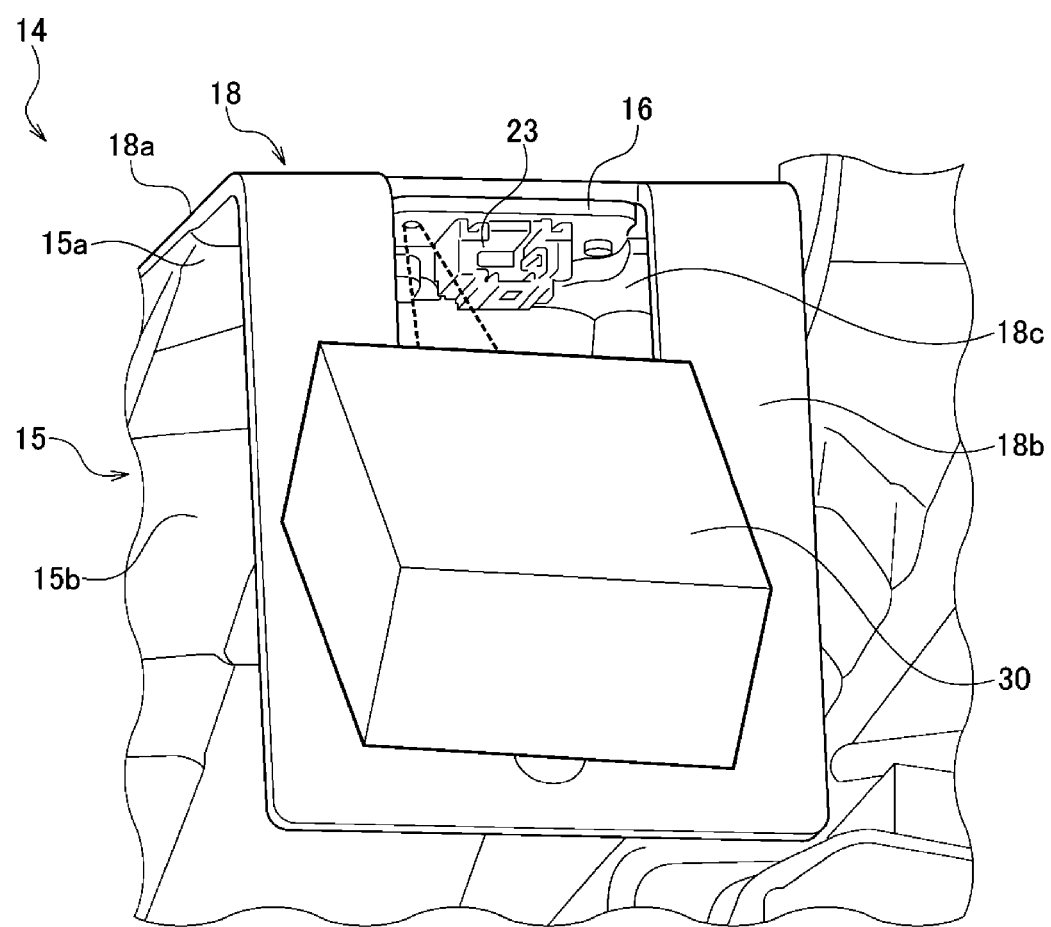
FIG. 3 is a schematic perspective view of main parts explaining how a temperature inspection of a lamp unit is performed.

FIG. 2 is a schematic cross-sectional view explaining how a temperature inspection of the lamp unit 14 is performed. FIG. 3 is a schematic perspective view of main parts explaining how a temperature inspection of a lamp unit 14 is performed.

As described above, the heat generated from the LED 17 is generally transferred to the first portion 18a and the second portion 18b of the heat sink via the support substrate 16, and then dissipated into the air in the lamp chamber 13. However, the LED 17 becomes high temperature and the light emitting efficiency may be deteriorated when the heat is not appropriately transferred from the support substrate 16 to the heat sink 18 due to some reasons. In order to prevent these problems, a temperature inspection is normally performed in a state where an LED is caused to emit light in an assembling of a vehicle lamp.

In the lamp unit 14 according to the present embodiment, an opening 18c configured to measure the radiant heat of the support substrate 16 is formed at the second portion 18b of the heat sink 18. The opening 18c is formed at an upper end portion of the second portion 18b, and as illustrated in FIG. 3, the rear end portion of the support substrate 16 is exposed at the rear side of the lamp unit 14 through the opening 18c. In the present embodiment, the radiant heat of the support substrate 16 is measured by using a radiant temperature sensor 30 through the opening 18c provided at the second portion 18b of the heat sink 18. In FIGS. 2 and 3, broken lines illustrated between the support substrate 16 and the radiant temperature sensor 30 schematically illustrate the radiant heat.

When the radiant heat measured by the radiant temperature sensor 30 exceeds a predetermined reference value (that is, radiant heat in a normal state), the measured lamp unit 14 is identified as the heat dissipation structure has some troubles.

In the present embodiment, the radiant temperature sensor 30 measures the radiant heat in a site neighboring to the standby side connector 23 at the rear end portion of the support substrate 16. However, the site of the support substrate 16 on which the radiant temperature sensor 30 measures the radiant heat is not limited thereto. The radiant temperature sensor 30 may measure the radiant heat of the peripheral site of the LED 17 in the support substrate 16. However, when there is a trouble in heat dissipation, the radiant heat is higher than that in the normal state even at the site of the support substrate 16 separated from the LED 17, and thus, it is possible to sufficiently identify the problem of the heat dissipation structure.

Further, in the lamp unit 14 according to the present embodiment, as illustrated in FIG. 3, the standby side connector 23 is exposed to the rear side of the lamp unit 14 through the opening 18c. Thus, it is possible to insert and remove the movable side connector 22 into and from the standby side connector 23 through the opening 18c. As the present embodiment, in a case where the second portion 18b of the L-shape heat sink 18 is arranged to extend downward from the first portion 18a, the insertion and removal of the movable side connector 22 may be difficult, since the standby side connector 23 is covered and blocked by the second portion 18b. It is possible to secure the insertability and removability of the movable side connector 22 by making the movable side connector 22 insertable and removable with respect to the standby side connector 23 through the opening as in the present embodiment.

The opening 18c may have any size as long as measurement of radiant heat of a part of the support substrate 16 by the radiant temperature sensor 30 when the movable side connector 22 is not inserted or removed through the opening 18c as in the present embodiment. The size is determined depending on, for example, performance of the radiant temperature sensor 30. Meanwhile, when the movable side connector 22 is inserted and removed through the opening 18c as in the present embodiment, the size of the opening 18c may be larger than a size of the cross-section perpendicular to the insertion direction of the movable side connector 22 in order to facilitate the insertion and removal of the movable side connector 22, in addition to being a size capable of performing the measurement of the radiant heat. In a more appropriate embodiment, the size of the opening 18c may be formed to have a size enough to accommodate a finger of an operator or a jig inserting or removing the movable side connector 22.

Figure 4:
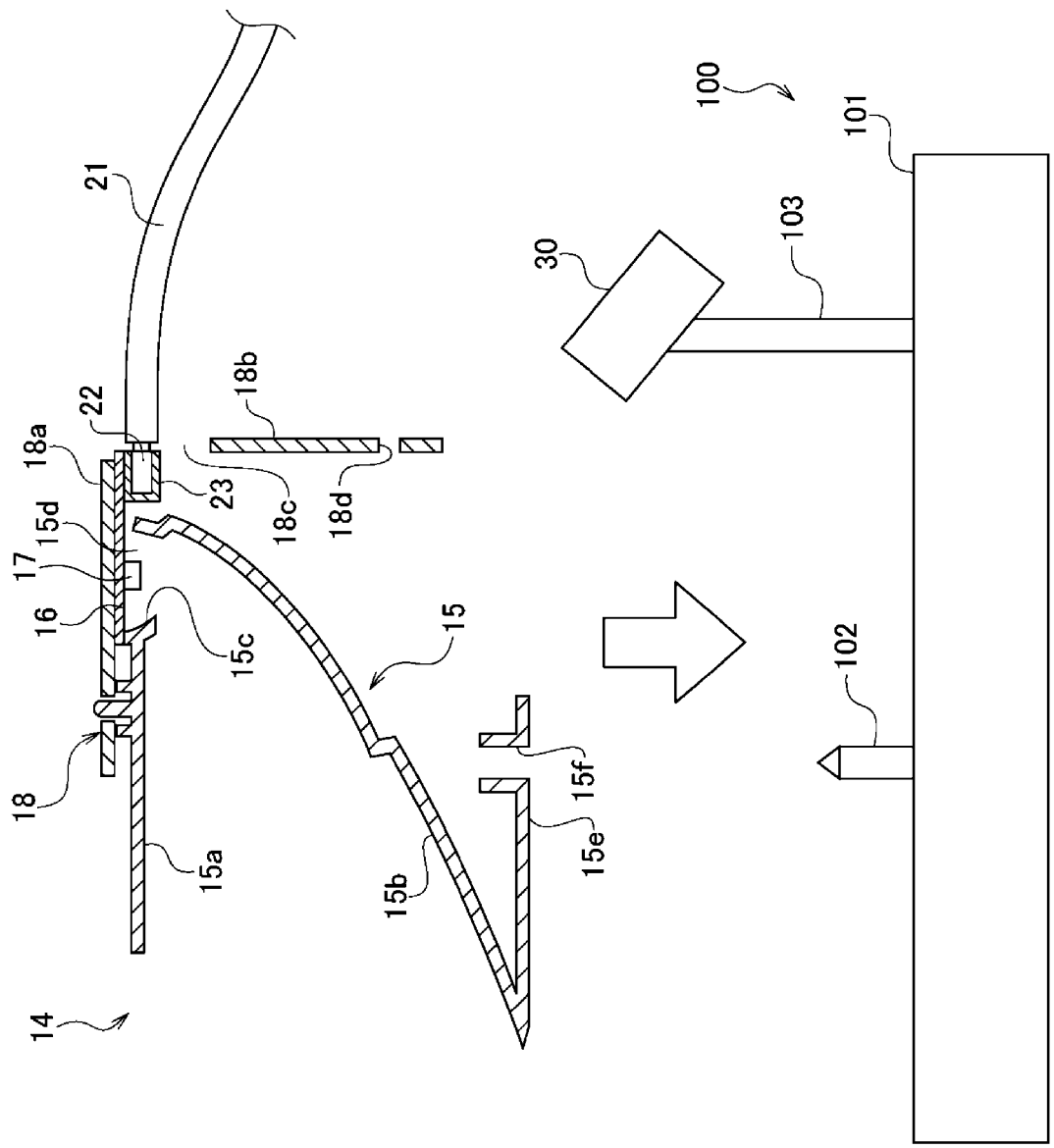
FIG. 4 is a view for explaining an inspection apparatus for a vehicle lamp according to another embodiment of the present disclosure.

FIG. 4 is a view for explaining an inspection apparatus 100 for a vehicle lamp according to another embodiment of the present disclosure. The inspection apparatus 100 is used for the temperature inspection of the above-described lamp unit 14.

As illustrated in FIG. 4, the inspection apparatus 100 includes a support table 101, a positioning pin 102 that is provided to be erected on the support table 101, the radiant temperature sensor 30, and a support portion 103 that is provided to be erected on the support table 101 to support the radiant temperature sensor 30.

As illustrated in FIG. 4, the reflector unit 15 of the lamp unit 14 includes a lower horizontal extending portion 15e that extends in the horizontal direction at the lower end portion of the reflector portion 15b, and a positioning hole 15f is formed at the lower horizontal extending portion 15e.

The lamp unit 14 is placed on the support table 101 when the temperature inspection of the lamp unit 104 is performed. At this time, the lamp unit 14 is positioned at a designed position by inserting the positioning pin 102 at the support table 101 into the positioning hole 15f of the lamp unit 14, and thus a predetermined measurement site of the support substrate 16 of the lamp unit 14 may be measured by the radiant temperature sensor 30 through the opening 18c. It is unnecessary to adjust the radiant temperature sensor 30 for each lamp unit 14 by using such an inspection apparatus 100, and thus, the workability of the inspection may be raised. Only one pair of the positioning pin 102 and the positioning hole 15f is illustrated in FIG. 4, but, of course, a plurality of pairs of the positioning pins 102 and the positioning holes 15f may be provided.

The vehicle lamp 10 according to the embodiment of the present disclosure has been described. In the vehicle lamp 10, the opening 18c is provided in the heat sink 18 so as to be able to measure the radiant heat of the support substrate 16 through the opening 18c. When the opening 18c is not provided in the heat sink 18, it is not easy to measure the radiant heat of the support substrate 16 due to the presence of the heat sink 18 and the reflector unit 15. For example, a method that detects the radiant heat of the support substrate 16 through the hold portion 15d by inserting the radiant temperature sensor 30 between the upper horizontal extending portion 15a and the reflector portion 15b may be considered. However, this method is very poor in workability and the reflector portion 15b may be damaged when the radiant temperature sensor 30 is inserted. Meanwhile, the workability is very high and there is no possibility of damaging, for example, the heat sink 18, when the radiant heat of the support substrate 16 is measured through the opening 18c provided in the heat sink 18 as in the embodiment.

In the above-described embodiments, the opening is formed as the opening 18c which is surrounded by the components of the heat sink 18 (that is, hole-shaped). However, the opening 18c is not limited thereto, and, for example, may be a cutout portion formed by cutting out a part of the second portion 18b of the heat sink 18.

Further, in the above-described embodiment, the cable 21 having the connector structure is used as the power supply 20. However, the cable 21 may be connected to the support substrate 16 in other methods such as soldering.

Further, in the above-described embodiment, the bent angle of the L-shape heat sink 18 is 90°, but other bent angles such as 80° or 70° may be used.

Further, in the above-described embodiment, the shape of the heat sink 18 is the L-shape having one bent portion including the first portion 18a and the second portion 18b, but the shape of the heat sink 18 is not limited thereto. For example, the shape of the heat sink 18 may be a U-shape having two bent portions including a third portion that extends horizontally forward from the lower end portion of the second portion 18b, in addition to the first portion 18a and the second portion 18b.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
   a light emitting source;
   a support substrate configured to support the light emitting source;

a heat sink configured to support the support substrate and dissipate heat from the light emitting source; and a reflector including a reflector portion that is configured to control light from the light emitting source and an extending portion that extends in a horizontal direction at a lower end portion of the reflector portion and includes a positioning hole into which a positioning pin of an inspection apparatus is inserted, wherein the heat sink includes an opening configured to allow for a radiant temperature sensor of the inspection apparatus to measure radiant heat of the support substrate.

2. The vehicle lamp of claim 1, wherein the heat sink is a plate that is bent so as to have a first portion and a second portion that is bent at a predetermined angle with respect to the first portion, the light emitting source is arranged on the first portion, and the opening is provided at an upper end portion of the second portion that meets the first portion.

3. The vehicle lamp of claim 1, wherein the opening is provided such that a part of the support substrate is exposed behind the vehicle lamp.

4. The vehicle lamp of claim 2, wherein the opening is provided such that a part of the support substrate is exposed behind the vehicle lamp.

5. A method for inspecting a vehicle lamp, the method comprising:

placing the vehicle lamp on a support table of an inspection apparatus, the vehicle lamp including a light emitting source, a support substrate configured to support the light emitting source, a heat sink configured to support the support substrate and dissipate heat from the light emitting source, and a reflector including a reflector portion that is configured to control light from the light emitting source and an extending portion that extends in a horizontal direction at a lower end portion of the reflector portion and includes a positioning hole;

positioning the vehicle lamp by inserting a positioning pin of the support table into the positioning hole of the vehicle lamp; and measuring radiant heat of the support substrate using a radiant temperature sensor of the inspection apparatus through an opening provided at the heat sink.

6. An apparatus for inspecting a vehicle lamp, the apparatus comprising:

a support table on which the vehicle lamp is placed, the vehicle lamp including a light emitting source, a support substrate configured to support the light emitting source, a heat sink configured to support the support substrate and dissipate heat from the light emitting source, and a reflector including a reflector portion that is light controller configured to control light from the light emitting source and an extending portion that extends in a horizontal direction at a lower end portion of the reflector portion and includes a positioning hole;

a positioning pin provided to be erected on the support table and inserted into the positioning hole of the vehicle lamp so as to position the vehicle lamp on the support table; and a radiant temperature sensor that measures radiant heat of the support substrate through an opening provided at the heat sink.

* * * * *